US012460794B2

(12) United States Patent
Dachlan et al.

(10) Patent No.: US 12,460,794 B2
(45) Date of Patent: *Nov. 4, 2025

(54) EXPLOSION PROTECTED LUMINAIRE

(71) Applicant: Hubbell Incorporated, Shelton, CT (US)

(72) Inventors: Ivon Dachlan, Glasgow (GB); Paolo Camillo, Glasgow (GB)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,102

(22) Filed: Dec. 26, 2024

(65) Prior Publication Data

US 2025/0122992 A1 Apr. 17, 2025

Related U.S. Application Data

(63) Continuation of application No. 18/332,259, filed on Jun. 9, 2023, now Pat. No. 12,203,632, which is a (Continued)

(51) Int. Cl.

*F21V 15/01* (2006.01)
*F21V 5/00* (2018.01)
*F21V 17/10* (2006.01)
*F21V 19/00* (2006.01)
*F21V 25/12* (2006.01)

(Continued)

(52) U.S. Cl.

CPC .............. *F21V 15/01* (2013.01); *F21V 5/007* (2013.01); *F21V 17/10* (2013.01); *F21V 19/003* (2013.01);

(Continued)

(58) Field of Classification Search

CPC . F21V 15/01; F21V 5/007; F21V 9/00; F21V 17/10; F21V 19/003; F21V 25/12

See application file for complete search history.

(56) References Cited

U.S. PATENT DOCUMENTS 1,233,967 A * 7/1917 Bluemel ................ F16D 31/02
192/60
5,839,822 A 11/1998 Oechsle (Continued)

FOREIGN PATENT DOCUMENTS

CN 202613222 U 12/2012
CN 104949006 A 9/2015

(Continued)

OTHER PUBLICATIONS

PCT/US2022/12139 International Search Report and Written Opinion dated Apr. 8, 2022.

(Continued)

*Primary Examiner* — James R Greece
*Assistant Examiner* — Michael Chiang
(74) *Attorney, Agent, or Firm* — Robinson + Cole LLP

(57) ABSTRACT

This application discusses components that can be used to prevent flame or hot gas transmission from the inside of a luminaire enclosure to the outside of a luminaire enclosure due to an internal explosion, thereby yielding an explosion encapsulating luminaire enclosure. Accordingly, the components and assemblies described herein can be safely integrated with systems that operate in the presence explosive gas.

20 Claims, 8 Drawing Sheets

Related U.S. Application Data continuation of application No. 17/574,222, filed on Jan. 12, 2022, now Pat. No. 11,788,710.

(60) Provisional application No. 63/136,362, filed on Jan. 12, 2021.

(51) Int. Cl.
*F21V 29/70* (2015.01)
*F21V 31/00* (2006.01)

(52) U.S. Cl.
CPC .............. *F21V 25/12* (2013.01); *F21V 29/70* (2015.01); *F21V 31/005* (2013.01)

(56) References Cited

U.S. PATENT DOCUMENTS

| | | | | |
|---|---|---|---|---|
| 9,634,206 | B1 | 4/2017 | Miedema | |
| 9,976,735 | B2 | 5/2018 | Honda et al. | |
| 12,276,412 | B2 * | 4/2025 | Dachlan | F21V 23/005 |
| 2009/0135607 | A1 | 5/2009 | Holloway | |
| 2011/0141728 | A1 * | 6/2011 | Russello | F21V 31/005<br>362/294 |
| 2014/0211474 | A1 | 7/2014 | Juan et al. | |
| 2015/0308673 | A1 | 10/2015 | Burmeister et al. | |
| 2016/0085022 | A1 | 3/2016 | Yang et al. | |
| 2016/0356475 | A1 | 12/2016 | Honda et al. | |
| 2020/0161818 | A1 | 5/2020 | Jiang et al. | |
| 2020/0278107 | A1 | 9/2020 | Freer et al. | |

FOREIGN PATENT DOCUMENTS

| | | | |
|---|---|---|---|
| CN | 207080903 | U | 3/2018 |
| KR | 1515779 | B1 | 5/2015 |

OTHER PUBLICATIONS

European Patent Application No. 22739986.2, extended European search report dated Oct. 31, 2024.

* cited by examiner

EXPLOSION PROTECTED LUMINAIRE

PRIORITY CLAIM

The present application is a continuation of U.S. patent application Ser. No. 18/332,259, filed Jun. 9, 2023, which is a continuation of U.S. patent application Ser. No. 17/574,222, filed Jan. 12, 2022, which claims the benefit of priority of U.S. Provisional Patent Application Ser. No. 63/136,362, titled "Explosion Protected Luminaire," filed Jan. 12, 2021, which is incorporated herein by reference.

BACKGROUND

The application relates to luminaires and components for luminaires.

Light fixtures, or luminaires, include electric light sources and provide an aesthetic and functional housing in both interior and exterior applications. Luminaire enclosures often comprise enough volume to close in a gas between a light emitting element(s) and a lens. Therefore, where luminaires are used in environments containing explosive gas, legal regulations sometime require luminaires to qualify for safe use in such an environment. Qualification for safe use of such a luminaire enclosure in an environment containing explosive gas may include a requirement that any flames or hot gas resulting from the ignition of explosive gas closed into the luminaire enclosure is encapsulated by the luminaire enclosure. That is, the requirement may be that the luminaire enclosure be capable of protecting an external environment from being affected by an explosion occurring within the luminaire enclosure (e.g. an explosion-tight or explosion encapsulating enclosure).

SUMMARY

According to an exemplary embodiment, a luminaire includes an explosion encapsulating luminaire enclosure including a luminaire enclosure lens.

Figure 1:
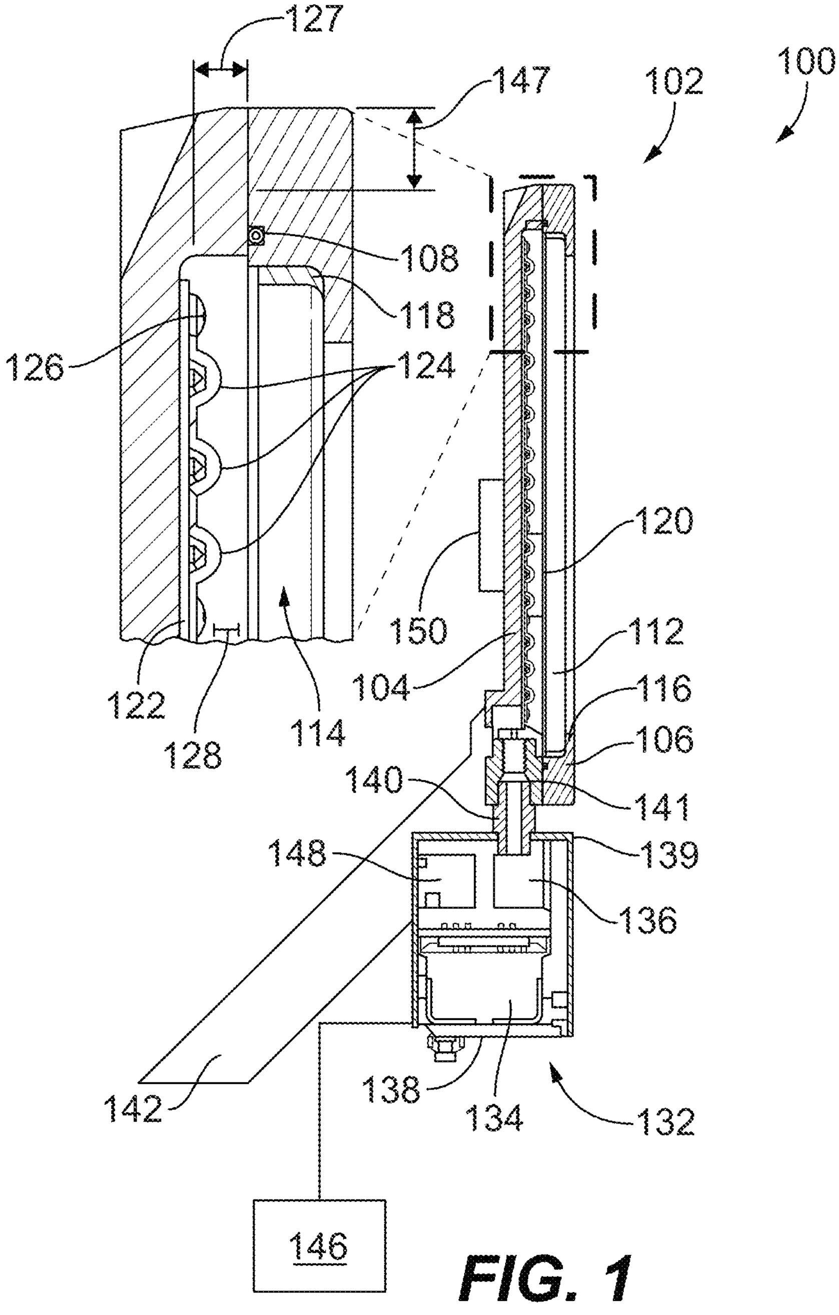
FIG. 1 is a sectional side view of a luminaire enclosure.

FIG. **5*a*** is a top view of an LED protective lens array.

FIG. **5*b*** is an underside view of an LED protective lens array including flame path gaps.

FIG. **5*c*** is a side view of an LED protective lens array.

FIG. **5*d*** is a detailed view of a LED protective lens design.

FIG. **6*a*** is a perspective view of a luminaire comprising an explosion encapsulating luminaire enclosure.

FIG. **6*b*** is a top view of a luminaire comprising an explosion encapsulating luminaire enclosure.

FIG. **7*a*** is a perspective view of a luminaire comprising an explosion encapsulating luminaire enclosure.

FIG. **7*b*** is a top view of a luminaire comprising an explosion encapsulating luminaire enclosure.

FIG. **8*a*** is a top view of a standalone battery indicator light lens.

FIG. **8*b*** is a sectional side view of a standalone battery indicator light lens.

DETAILED DESCRIPTION

Before any embodiments are explained in detail, it is to be understood that embodiments described and illustrated are not limited in their application to the details of construction and the arrangement of components set forth in the following description or illustrated in the following drawings. The embodiments described and illustrated may be practiced or carried out in various ways and other embodiments are possible.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it were stated in this document that "item Z may comprise element A or B," this may be interpreted to disclose an item Z comprising only element A, an item Z comprising only element B, as well as an item Z comprising elements A and B.

Various embodiments described herein are directed to luminaire components that prevent a transmission of flames or hot gas from the inside of a luminaire enclosure to the outside of a luminaire enclosure due to an explosion occurring within the luminaire enclosure. In certain aspects, the luminaire enclosure can be used in an environment containing explosive gas, for example, in specialized lab work, testing applications, or high-risk areas such as mines or accelerant production or processing applications. A luminaire inside the luminaire enclosure may include light emitters configured to emit light directly through a luminaire enclosure lens (e.g. LEDs). This application discusses components that can be used to prevent explosive flame or hot gas transmission from the inside of a luminaire enclosure to the outside of a luminaire enclosure, thereby yielding an explosion encapsulating luminaire enclosure. A specialized luminaire enclosure that protects against internal explosions resulting in a transmission of an internal flame or hot gas to the exterior of the luminaire results while still facilitating a transmission of light from the interior of the luminaire enclosure to the exterior of the luminaire enclosure can be achieved by the principles disclosed herein. Accordingly, the components and assemblies described herein can be safely integrated with systems that operate in the presence explosive gas.

FIG. 1 illustrates a sectional side view of a luminaire system 100 comprising a luminaire enclosure 102 including a luminaire enclosure backing 104 and a luminaire enclosure cover 106. The luminaire enclosure backing 104 and luminaire enclosure cover 106 are secured together in a manner that encapsulates any flame or explosion that occurs within the luminaire enclosure 102 and thereby prevents any such flame or explosion from escaping the luminaire enclosure 102 at any point at which the luminaire enclosure backing 104 and luminaire enclosure cover 106 meet. Moreover, the luminaire enclosure 102, when assembled, is capable of fully encapsulating any explosion that may occur within the luminaire enclosure 102 according to a protective standard. For example, the explosion encapsulating protective standard of the luminaire enclosure 102 may be the Ex d standard. Under this and other protective standards, an enclosure must be able to encapsulate an explosion and allow flue gasses to escape after cooling enough to eliminate or greatly reduce the risk of igniting a flame or causing an explosion outside of the enclosure. A luminaire enclosure lens 112, disposed in the luminaire enclosure 102, allows light to be transmitted from the inside of the luminaire enclosure 102 to the outside of the luminaire enclosure 102 while also maintaining the explosion encapsulating protective standard of the luminaire enclosure 102.

In the embodiment shown, an encapsulating gasket 108 is disposed between the luminaire enclosure backing 104 and the luminaire enclosure cover 106, thereby further ensuring that no hot gas or flame is transmitted from the inside of the luminaire enclosure 102 to the outside of the luminaire enclosure 102 as a result of an explosion. Specifically, the encapsulating gasket 108 ensures that no hot gas or flame is transmitted from the inside of the luminaire enclosure 102 to the exterior of the luminaire enclosure 102 via a seam of the luminaire enclosure 102 in which the encapsulating gasket 108 is disposed. In the embodiment shown, a seam where the luminaire enclosure backing 104 and the luminaire enclosure cover 106 meet forms a sufficiently lengthy outer flame path 147 joining the interior of the luminaire enclosure 102 to the exterior of the luminaire enclosure. The outer flame path 147 helps to mitigate the transmission of flames or hot gasses from the interior to the exterior of the luminaire enclosure 102 by suffocating flames and forcing hot gasses to cool before exiting the luminaire enclosure. The luminaire enclosure cover 106 includes a lens accommodating window 114 having at least an outer bezel lip 116. In the embodiment shown, the luminaire enclosure lens 112 is cemented into place within a lens accommodating window 114 of the luminaire enclosure cover 106, against the outer bezel lip 116, by a sealing agent 118. The sealing agent 118 may be a silicone sealant adhesive, but may include other sealing agents. In some embodiments, the luminaire enclosure cover 106 secures the luminaire enclosure lens 112 to the luminaire enclosure backing 104, by sandwiching the luminaire enclosure lens 112 between the luminaire enclosure cover 106 and luminaire enclosure backing 104 or an extension of either (e.g. spacer portion 127). In other embodiments, the lens accommodating window 114 also includes an inner bezel lip (not shown). In other embodiments, the luminaire enclosure lens 112 may be retained between the outer bezel lip 116 and an inner bezel lip (not shown) of the lens accommodating window 114.

In the embodiment shown, the cementing of the luminaire enclosure lens 112 into the lens accommodating window 114 by the sealing agent 118 creates an explosion-tight seal between the luminaire enclosure lens 112 and the luminaire enclosure cover 106. This explosion-tight seal disallows flames or hot gasses likely to ignite a flame or cause an explosion, from exiting the luminaire enclosure 102 between the luminaire enclosure lens 112 and the luminaire enclosure cover 106. The luminaire enclosure cover 106, the encapsulating gasket 108, and an explosion protected luminaire enclosure lens 112, are secured to one another, and fastened to the luminaire enclosure backing 104 via one or more enclosure fasteners (not shown). In this way, the luminaire enclosure cover 106, when fastened to the luminaire enclosure backing 104 according to the methods and products described herein, creates an explosion encapsulating luminaire enclosure 102. In some embodiments, the encapsulating gasket is secured to the luminaire enclosure backing 104 or is free-floating.

In most embodiments, the luminaire enclosure lens 112 is generally planar in shape, but it is contemplated that the luminaire enclosure lens 112 may take other shapes and that other configurations may be used. In embodiments where the luminaire enclosure lens 112 is non-planar, the luminaire enclosure lens 112 may still be qualified for use in environments containing explosive gases or under an explosion encapsulating protective standard. Additionally, the luminaire enclosure lens 112 can be plain or it can have optical features (e.g. frosting, textured surface, prisms, etc.) that alter or condition light emitted from a visible light emitter, such as LED arrays 120. The luminaire enclosure lens 112 can also be used to address color mixing or color angle concerns.

In the embodiment shown, a plurality of LED arrays 120 is arranged on a pcb board 122. A plurality of LED protective lens arrays 124 are secured to the luminaire enclosure backing 104, through the pcb board 122. The LED protective lens arrays 124 are positioned over each of the LED arrays 120 and secured to the pcb board 122. Luminaire enclosure lens 112 is positioned at a distance from the LED protective lens arrays 124 and pcb board 122. In the embodiments shown, a spacer portion 127 of the assembled luminaire enclosure 102 defines a luminaire cavity 128 between the LED protective lens arrays 124 and the luminaire enclosure lens 112 by mechanically preventing the movement of the luminaire enclosure lens 112 and the pcb board 122 toward one another within the luminaire enclosure 102. In fabricating the luminaire enclosure 102, the volume of the luminaire cavity 128 may be strategically determined based on a particular explosion encapsulating protective standard. For example, if the Ex d protection standard is applied, the volume of the luminaire cavity 128 is minimized when fabricating the luminaire enclosure 102. For example, to adhere to a particular explosion encapsulating standard, the dimensions of the luminaire enclosure cover and the luminaire enclosure backing may be chosen so that the height of the luminaire cavity (i.e., the distance between the luminaire lens and the luminaire enclosure backing) is between 5 mm and 100 mm. Minimizing the volume of the luminaire cavity 128 while adhering to flame path and gap requirements helps to reduce the required reference pressure that the luminaire enclosure 102 must withstand during an overpressure test used in qualification of an enclosure under the Ex d protection standard, in particular. In addition to helping to encapsulate an internal explosion, the luminaire enclosure lens 112 prevents transmission of any flame, resulting from an explosion within the luminaire enclosure 102, to the exterior of the luminaire enclosure 102. In this way, the luminaire cavity 128 provides a secondary internalized burn out path for any ignited flammable gas within the luminaire enclosure 102. More broadly, the luminaire cavity 128 provides additional space for ignited explosive or flammable gas ignited under the LED protective lens arrays 124 to burn out without any flames or hot gas (e.g. likely to ignite an external flammable or explosive gas) from reaching the exterior of the luminaire enclosure 102 without cooling first.

In the embodiment shown, the luminaire enclosure backing 104 comprises a heat conductive material and acts as a heatsink for the pcb board 122 which may heat up during operation. The luminaire enclosure backing 104 acts as a mounting surface for the pcb board 122 and may conduct heat to the luminaire enclosure backing 104 via the mechanical fasteners 126 or via surface contacts or heat pipes. In some embodiments, the entire luminaire enclosure 102 may be comprised of a lightweight, heat-conductive metal such as aluminum or titanium. In this way, the entire luminaire enclosure may be used as a heatsink for the LED arrays 120 and the pcb board 122 during operation of the luminaire system 100. In some embodiments, only certain parts, such as limited portions of the luminaire enclosure backing 104 and luminaire enclosure cover 106 comprise a heat-conductive material. In such embodiments, those certain parts may be used as localized heatsinks.

In the embodiment shown, the luminaire system 100 includes a controls enclosure 132 that encloses a lighting gearbox 134 and an LED driver 136. Here, the controls enclosure 132 is also qualified to encapsulate an explosion occurring within the controls enclosure 132. That is, the controls enclosure 132 comprises a controls enclosure backing 138 and controls enclosure cover 139 that, when secured together, yield a seal that prevents flames or hot gasses inside the controls enclosure 132 from reaching the outside of the controls enclosure 132 (e.g. Ex d protection qualified). In the embodiment shown, the controls enclosure 132 removably connects to the luminaire enclosure 102 via an adaptor 140. In some embodiments, the adaptor 140 connects the controls enclosure 132 to the luminaire enclosure 102 via electrical contacts. In other embodiments, the adaptor 140 connects the controls enclosure 132 to the luminaire enclosure 102 wirelessly. In still other embodiments, the adaptor 140 connects the controls enclosure 132 to the luminaire enclosure 102 via a removable or fixed wired connection. In the embodiments wherein electrical wires of contacts run through the adaptor 140, the adaptor is also qualified to encapsulate an explosion, via adaptor gasket 141, so that an explosion, flames, or hot gases will not be transmitted from the luminaire enclosure 102 to the controls enclosure 132, or vice versa without cooling first.

In the embodiment shown, the lighting gearbox 134 is configured to perform analog regulation of an electrical input from a power source (not shown) and output a regulated electrical signal to the LED driver 136. The LED driver 136 delivers an electrical signal to the LED arrays 120 based upon the regulated electrical signal received from the lighting gearbox 134, causing the LED arrays 120 to emit light.

One or more mounting components 142 may be disposed on one or more portions of the luminaire enclosure 102. The mounting components 142 may be configured to secure the luminaire enclosure 102 to a rod, a cord, a chain, or any other known component or assembly for attaching a luminaire to a surface or hanging it therefrom. The mounting components 142 may also be configured to connect the luminaire enclosure 102 to a pole, post, ceiling, or other structure. Mounting components 142 may also include brackets having a pair of openings that receive fasteners to fasten the luminaire enclosure 102 to a wall. Similar mounting components can also be used to secure the controls enclosure 132 to a surface.

The LED driver 136 may be disposed in the luminaire enclosure 102 or in the controls enclosure 132. Similarly, lighting gearbox 134 may be disposed in the luminaire enclosure 102 or in the controls enclosure 132. A power supply 146 may provide power to the luminaire enclosure 102 or controls enclosure 132 and in turn the pcb board 122, the LED driver 136 and the LED arrays 120. The LED driver 136 provides a power signal to the LED arrays 120, causing them to emit light. The power supply 146 may be any combination of drivers, ballasts, or other power supply depending on the type of LEDs in the LED arrays 120. The LED driver 136 can be a separate component or can be integrated with a light engine on the same circuit board as the LED arrays 120. For example, the power supply 146 may be a power signal corrector including components such as a voltage regulator or bridge rectifier. Additionally, the power supply 146 may be an onboard or externally connected battery. In certain aspects, the luminaire enclosure can be connected to power supply 146 or connected directly to line power (not shown).

One or more control components 148, may be connected to or integrated with the luminaire system 100. The control components 148 can include backup battery units, fuses, microprocessors, FPGAs, surge protectors, wired or wireless communication modules (e.g., CAT5, radio, Wi-Fi, etc.), sensors (e.g., light, occupancy, motion, heat, temperature, etc.), or any combination thereof. In some embodiments, the control components 148 include components facilitating the connection of the luminaire system 100 to a network that includes other luminaire controllers and one or more controllers for distributed communication and centralized control of the luminaire system 100.

Certain embodiments utilize reflectors, baffles, louvers or other optical features to direct light through the luminaire enclosure lens 112 during operation of the luminaire system 100. FIG. 1 shows an embodiment of a luminaire system 100 illustrated as a linear luminaire. LED arrays 120 are positioned in the luminaire enclosure 102 and configured to emit visible light directly through the luminaire enclosure lens 112. However, in other embodiments, reflectors, louvers, fiber optics, or baffles may be used to transmit light emitted by the LED arrays 120 through the luminaire enclosure lens 112 indirectly.

Figure 2:
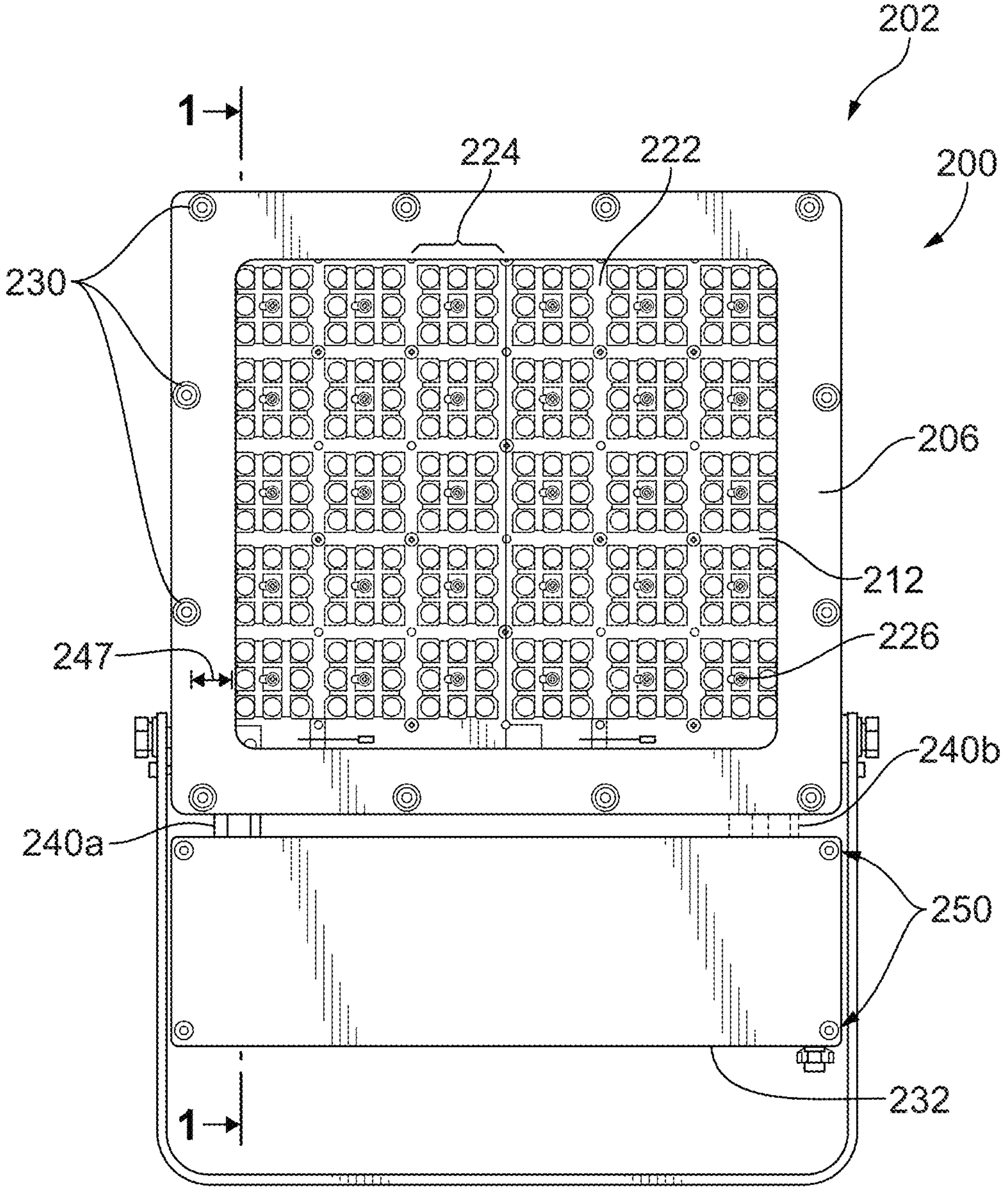
FIG. 2 is a front view of the luminaire enclosure.

FIG. 2 illustrates a front view of the luminaire system 100, 200. Enclosure fasteners 230 are positioned along the perimeter of the luminaire enclosure cover 206. The even spacing of enclosure fasteners 230 may help ensure a seal against the luminaire enclosure backing 104 that retains hot flue gases or flames after an internal explosion. Mechanical fasteners 226 secure the pcb board 222, and LED protective lens arrays 124, 224 to the luminaire enclosure backing 104, thereby creating a flame-tight seal between the luminaire enclosure backing 104 and luminaire enclosure cover 106 via encapsulating gasket 108. The mechanical fasteners 226 also ensure that an outer flame path 247 is disposed between the luminaire cavity 128 and the encapsulating gasket 108. As with other flame paths, the outer flame path 247 allows flames to suffocate and hot gasses to cool as they travel through the flame path. In the case of the outer flame path 247, the flames or hot gasses are cooled before they reach the exterior of the luminaire enclosure 102, 202, specifically.

Figure 3:
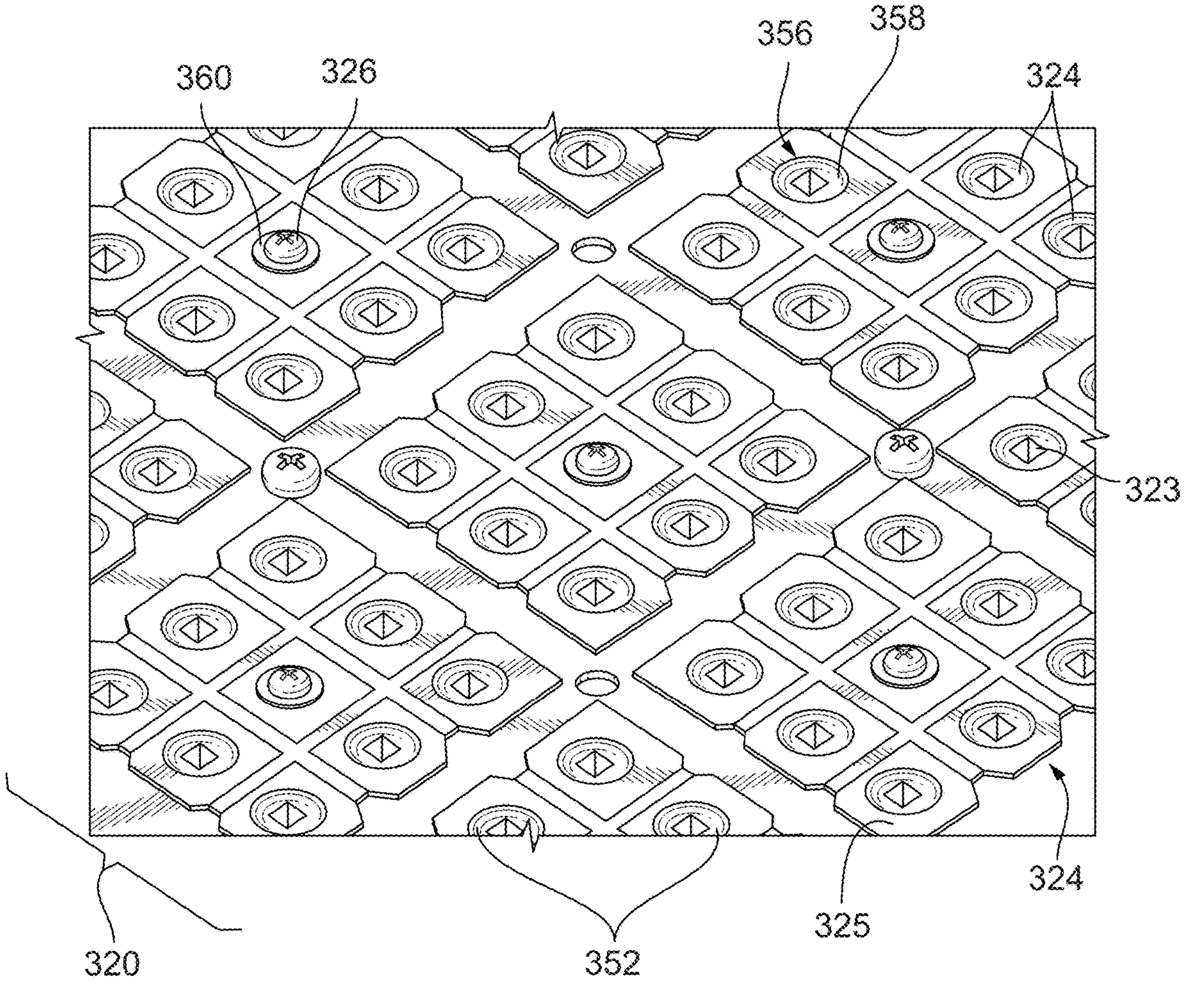
FIG. 3 is a view of a pcb board, LED array, and LED protective lens array configuration in an explosion protected luminaire enclosure.

FIG. 3 illustrates a closeup view of LED protective lens arrays 324 within the luminaire enclosure 202 is shown. A plurality of LED arrays 320 is configured to emit light directly through the LED protective lens arrays 324 and luminaire enclosure lens 112, 212, when powered. In the embodiment shown, the LED protective lens arrays 324 are tightly secured in over the LED arrays 320, creating a mechanical seal that disallows a flame or hot gas from travelling into or out of any of the protective lenses 352 within LED protective lens arrays 324 before cooling. In some embodiments, rear surfaces opposite respective front surfaces 325 of the LED protective lens arrays 324 are cemented into place with a sealing agent (not shown) that aids in making each of the LED protective lens arrays 324 explosion encapsulating. For example, the scaling agent may be a silicone sealant adhesive, but may include other sealing agents. In some embodiments, an explosion retaining LED protective lens array gasket (not shown) may be used in conjunction with the LED protective lens arrays 324. In such cases, the LED protective lens arrays 324 may be pressed down onto the LED protective lens array gasket, thereby creating the aforementioned mechanical, flame and hot gas encapsulating seal. That is, during assembly of the luminaire system 100, the underside of the LED protective lens arrays 324 are positioned over the pcb board 322 and fastened to the luminaire enclosure backing 104, 204, through the LED protective lens arrays 324 and the pcb board 322 using mechanical fasteners 326.

In the embodiment shown, the LED protective lens array 324 includes eight LED protective lenses 356 in a rectangular configuration. Each LED protective lens 356 includes an LED accommodating cavity 358. The LED protective lens array 324 also includes a center aperture 360 configured to receive the mechanical fastener 326. Accordingly, the LED protective lens array 324 is configured to be attached to the pcb board 222 by way of mechanical fasteners 126 interacting with the pcb board 222 via the center aperture 360. The LED accommodating cavities are 358 are configured to overlay and protect the individual LED elements 323 of the LED arrays 120 when the LED protective lens array 324 is placed onto the pcb board 222.

In the embodiment shown, the LED protective lens arrays 324 can be fastened to the luminaire enclosure backing 304 to create sufficient pressure between the LED protective lens arrays 324 and the pcb board 322 creating a sufficiently resistive flame paths (not shown) under the LED protective lens arrays 324. The flame paths and mitigate the effects of a flame igniting within one of the LED protective lens arrays 324 on items exterior to the LED protective lens arrays 324. Additionally, in some embodiments, an LED protective lens array clamp plate (not shown) can be positioned over the LED protective lens arrays 324 and fastened to the luminaire enclosure backing 304 thereby sandwiching the LED protective lens arrays between the LED protective lens array clamp plate and the pcb board 322 and creating even more pressure on the flame path.

Figure 4:
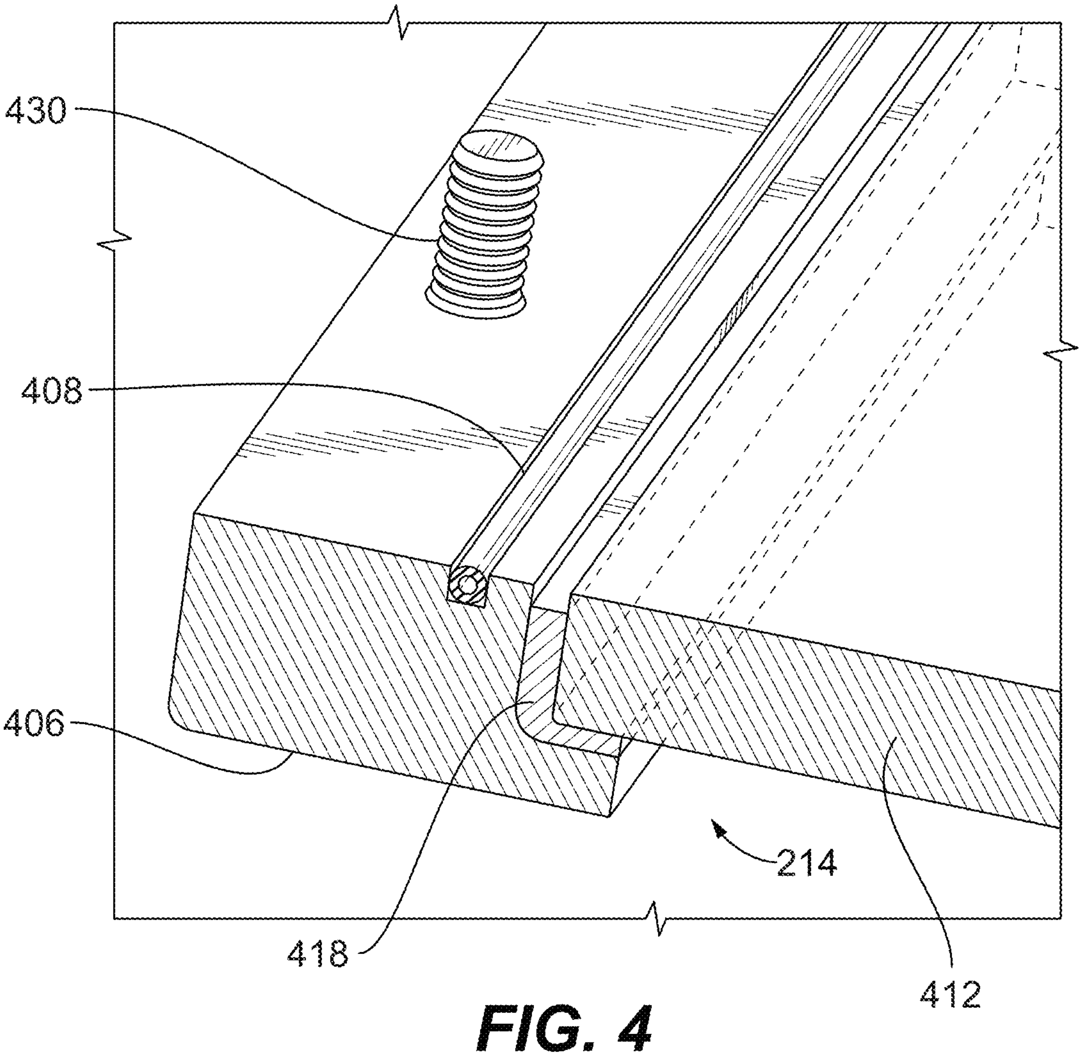
FIG. 4 is a detailed view of a luminaire enclosure lens securing structure of the luminaire enclosure cover.

FIG. 4 illustrates a luminaire enclosure cover 406 including an encapsulating gasket 408 a luminaire enclosure lens 412 and an enclosure fastener 430. The luminaire enclosure cover 406 is configured to ensure that the luminaire enclosure 202, is explosion encapsulating when secured to the luminaire enclosure backing 104 according to the methods and products described herein. For example, the sealing agent 418 cements the luminaire enclosure lens 412 into the lens accommodating window 214 of the luminaire enclosure cover 406. The sealing agent 418 may be explosion-tight, and thereby create an explosion encapsulating seal between the luminaire enclosure lens 412 and the luminaire enclosure cover 406 that disallows flames or hot gasses from exiting the luminaire enclosure 102, 202 between the luminaire enclosure lens 412 and the luminaire enclosure cover 406. Similarly, in some embodiments, the encapsulating gasket 408 is explosion-tight. In embodiments wherein the luminaire enclosure cover 106 is explosion-tight, and the luminaire enclosure cover 106 is explosion-tight and comprises an explosion-tight encapsulating gasket 408 the entire luminaire enclosure 202 becomes explosion encapsulating when fastened together by the enclosure fasteners 430.

In a number of embodiments, the encapsulating gasket 108 may not aid in encapsulating an explosion and in some embodiments may not be present. For example, in some embodiments, the encapsulating gasket may be configured primarily to prevent the ingress of dust or liquid into the luminaire enclosure 102. As another example, the encapsulating gasket 108 may be excluded from the luminaire enclosure 102 because, for a particular use of the luminaire system 100, there may be no need to prevent the ingress of dust or liquid into the luminaire enclosure 102.

In some embodiments, the luminaire enclosure lens 412 is held in or to the luminaire enclosure 202 in manners not shown. For example, in some embodiments, the scaling agent 418 cementing the luminaire enclosure lens 412 in or to the luminaire enclosure cover 406 can be replaced by mechanical fasteners, welds, etc. Similarly, in some embodiments, mechanical fasteners and enclosure fasteners may be replaced by adhesives, welds, etc.

In some embodiments, a heatsink 150 can be positioned in or on the luminaire enclosure 202 and draw heat from the LED arrays 320, during operation. However, in most cases, the luminaire enclosure 202, is constructed of a heatsinking material such as a heat conductive metal, and the luminaire enclosure 102 itself may therefore act as a heatsink for the LED arrays 120, during operation. It is also contemplated that same embodiments do not include a heat sink.

Figure 5A:
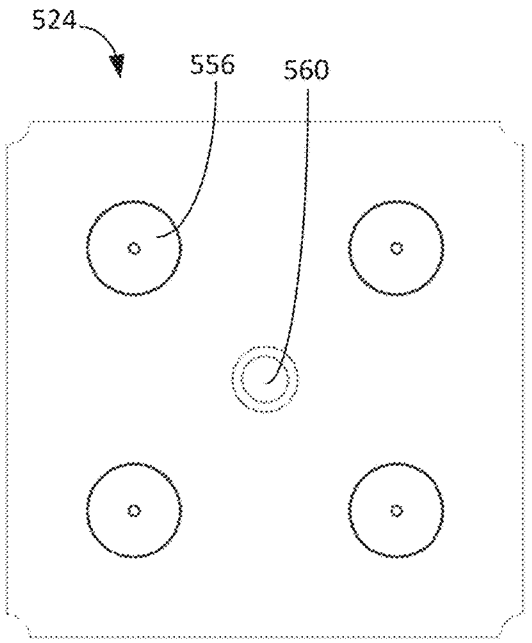
Figure 5B:
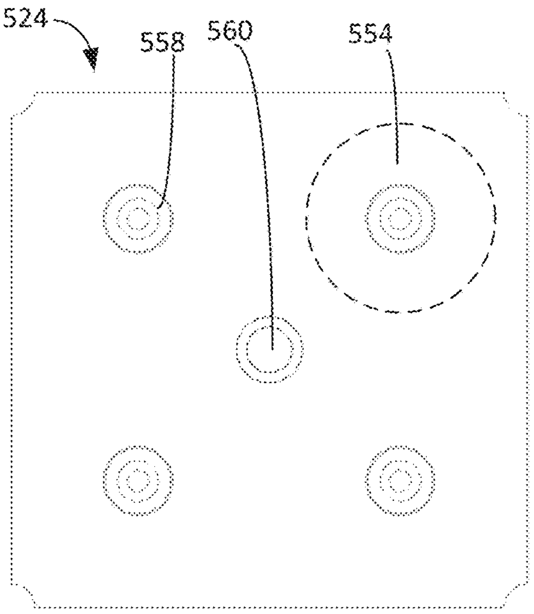
Figure 5C:
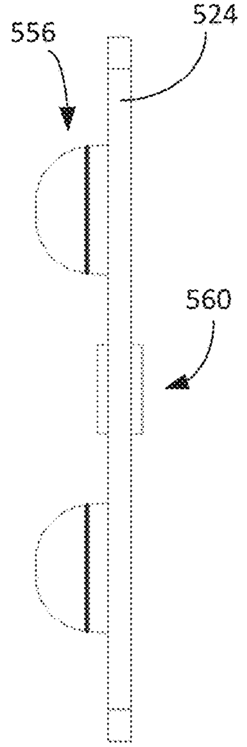

FIGS. 5*a*, 5*b*, and 5*c* illustrate a LED protective lens array 524 including four LED protective lenses 556 in a 2×2 configuration and a flame path 554. Each LED protective lens 556 includes an LED accommodating cavity 558. the LED protective lens array 524, and includes a center aperture 560 configured to receive the mechanical fastener 226. The LED protective lens array 524 also includes, at its corners, fastener accommodating cutouts 562 configured to be engaged by a mechanical fastener 126. The LED protective lens array 524 is configured to be attached to the pcb board 222 by way of mechanical fasteners 126 interacting with the pcb board 222 via at least one of the center aperture 560 and the fastener accommodating cutouts 562. The LED accommodating cavities are 558 are configured to overlay and protect the individual LED elements 323 of the LED arrays 120 when the LED protective lens array 524 is placed onto the pcb board 222.

Figure 5D:
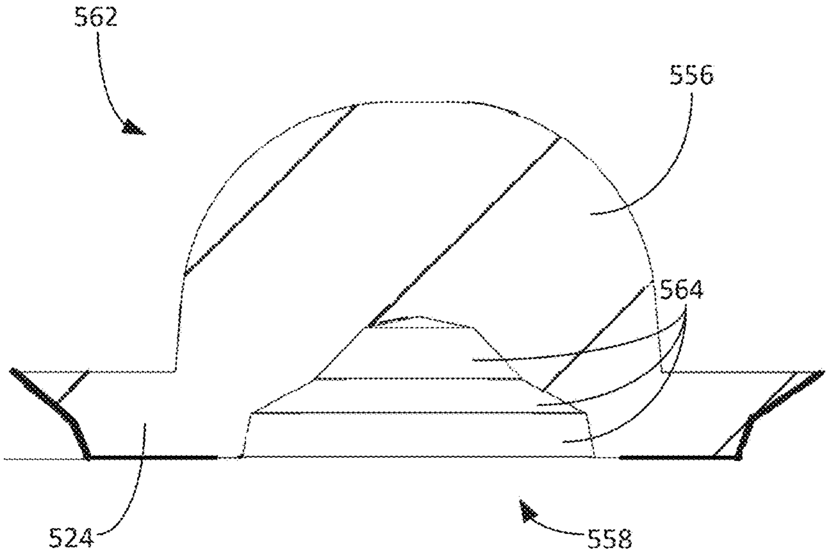

FIG. 5*d* illustrates a cross-section 562 of an embodiment of the led protective lens 556. In the embodiment shown, the LED accommodating cavity 558 includes plurality of inner walls 564 forming tiered, concentric, conical cavities of differing slopes, diameters, and heights. In the embodiment shown, the outermost wall of the plurality of inner walls 564 has a diameter of 6.7 millimeters and a height of 0.84 millimeters; a second wall, just above the outermost wall, has a diameter of 6.37 millimeters and rises 0.64 millimeters above the outermost wall; a third wall, just above the second wall has a diameter of 3.97 millimeters and rises 1 millimeter above the second wall; lastly, a final wall, just above the third wall, rises 0.21 millimeters above the third wall, has a diameter of 2.06 millimeters, and comes to a closed, conical apex in the center of the LED accommodating cavity 558.

Figure 6A:
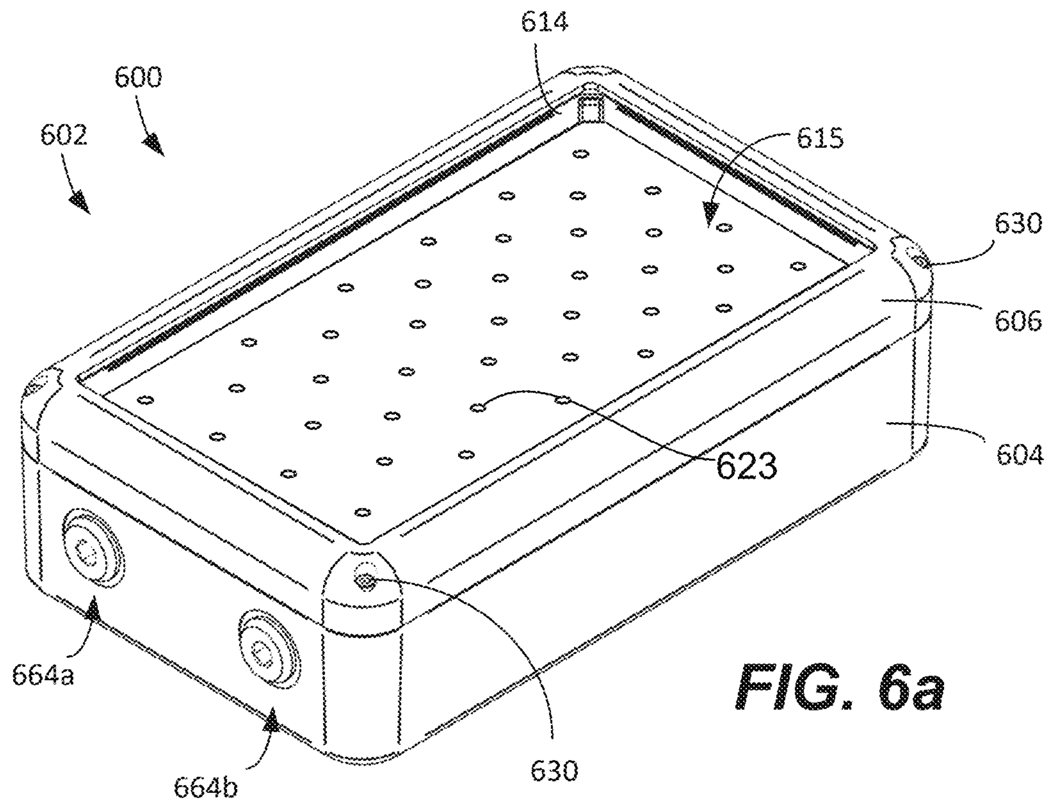
Figure 6B:
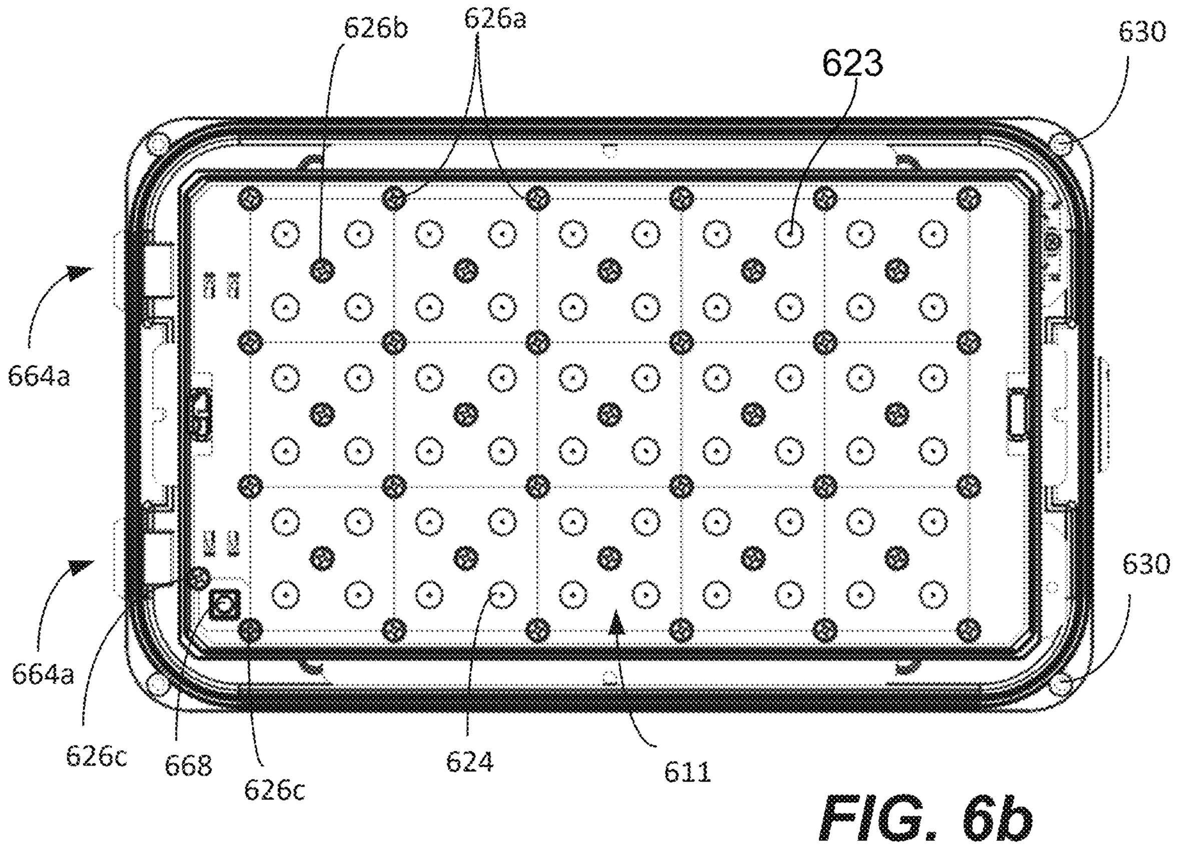

FIGS. 6*a* and 6*b* illustrate a perspective view and a top view, respectively, of the luminaire system 600 including a luminaire enclosure 602. Enclosure fasteners 630 (screws, in the embodiment shown) are positioned along the perimeter edge of the luminaire enclosure cover 606. The even spacing of enclosure fasteners 630 help ensure a, explosion protected seal including at least one flame path 247 is formed between the luminaire enclosure cover 606 and the luminaire enclosure backing 604. Additionally, adaptors 664*a*, 664*b* provide channels for an exterior power or data source (not shown) to communicate electronically with a control board (not shown) of the luminaire 602 or with the pcb board 122. For example, a controls enclosure 232 may be configured to communicate with the luminaire 602 via the adaptors 664*a*, 664*b* and control the LED arrays 624 or the individual LED elements 623. The luminaire 602 also includes a standalone battery indicator light 668 configured to indicate a condition of the battery (e.g., a low charge condition, a charged condition, a damaged condition). As will be discussed in further detail below, a standalone flame protected LED optic houses the standalone battery indicator light 668 and provides flame protection for the standalone battery indicator light 668.

In the embodiment shown, a mounting surface 615 of the luminaire enclosure backing 604 is visible through the lens accommodating widow 614 of the luminaire enclosure cover 606. The mounting surface comprises a plurality of mechanical fastener engaging cavities 616 configured to receive mechanical fasteners 326 for fixing the protective LED lens arrays 524 to the pcb board 122, and the pcb board 122 and protective LED lens arrays 524 to the mounting surface 615 of the luminaire enclosure backing 604. The volume of the luminaire cavity 128 is determined to prioritize the flame and hot gas protection described herein by reducing the internal pressure that can potentially be caused by an explosion in the luminaire cavity 128. Accordingly, the volume of the luminaire cavity 128 is minimized when fabricating the luminaire enclosure 602 so that an explosion occurring in the luminaire cavity 628 is accordingly contained with less effort than would be required if luminaire cavity 628 was relatively large.

Although not shown in FIGS. 6*a* and 6*b*, the luminaire 602 may include a hollow compartment disposed on a backside of the luminaire enclosure backing 604. The hollow compartment may contain mounting equipment configured to mount the luminaire enclosure backing 604 (and thereby the luminaire 602) to a surface (e.g., a wall, a ceiling, a doorway). The hollow compartment may also be used for storage of electronic components (e.g., a battery, a controls circuit).

Figure 7A:
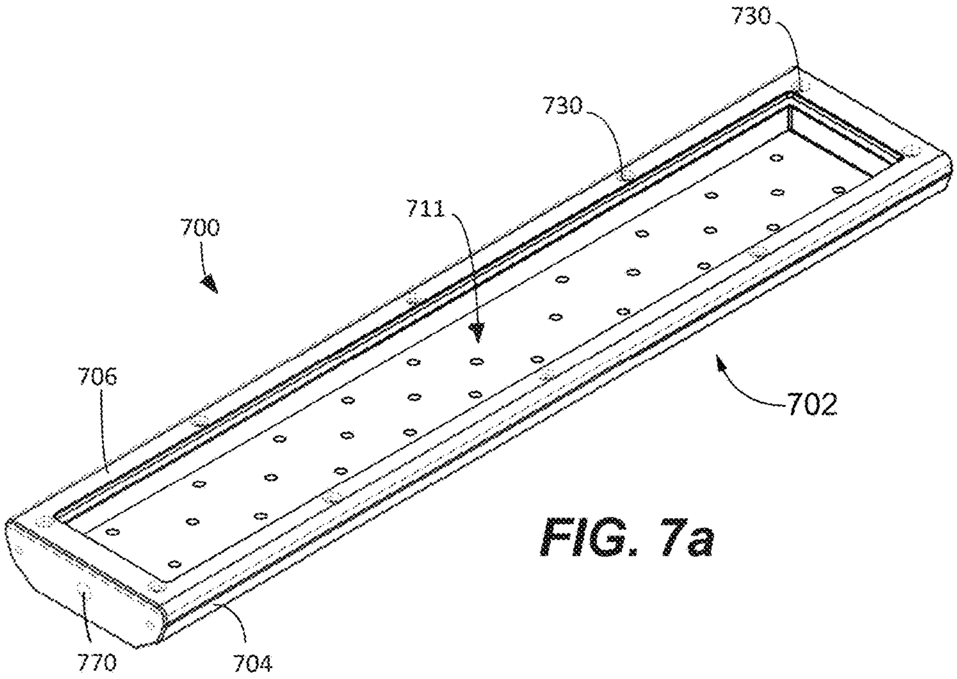
Figure 7B:
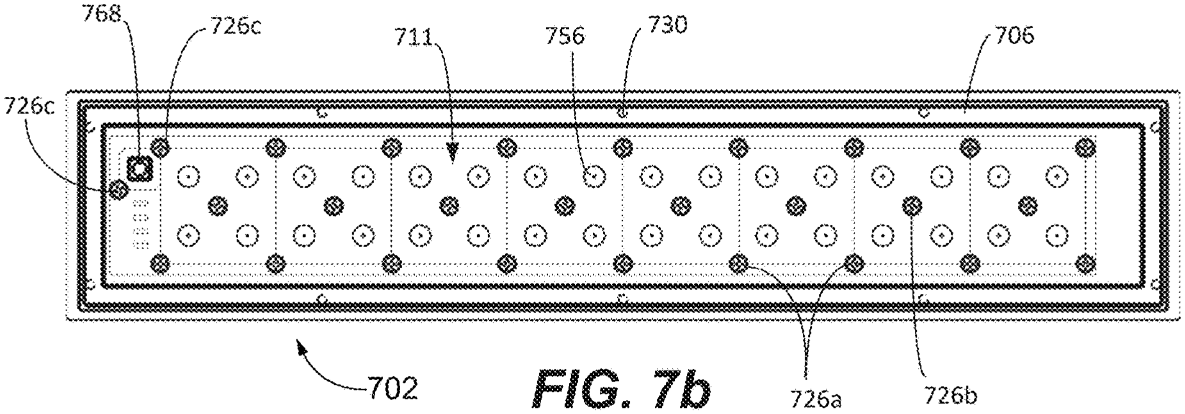

FIGS. 7*a* and 7*b* illustrate a perspective view and a top view, respectively, of another luminaire system 700 including a luminaire enclosure 702. Enclosure fasteners 730 (screws, in the embodiment shown) are positioned along the perimeter edge of the luminaire enclosure cover 706. As with the luminaire 602 shown in FIG. 6*a*, the even spacing of enclosure fasteners 730 help ensure an explosion protected seal of the luminaire enclosure cover 706 against the luminaire enclosure backing 704. Mechanical fasteners 726 fix the LED protective lens arrays 724 over the pcb board 722 by mechanically engaging the luminaire enclosure backing 704 through the pcb board 722. In the embodiment shown, a plurality of LED arrays 720 is configured to emit light through the luminaire lens 712. Additionally, aperture 770 provides a way for an exterior power or data source (not shown) to communicate electronically with a control board (not shown) of the luminaire 702 or with the pcb board 722, as described above, with respect to FIG. 6. As with the luminaire of FIGS. 6*a* and 6*b*, the luminaire 702 includes a standalone battery indicator light 768 configured to indicate a condition of the battery (e.g., a low charge condition, a charged condition, a damaged condition). Additionally, aperture 770 is configured to maintain the explosion protected status of the luminaire 702 by forming a flame and hot gas seal against the materials inserted therein (e.g., wires, a plug).

Figure 8A:
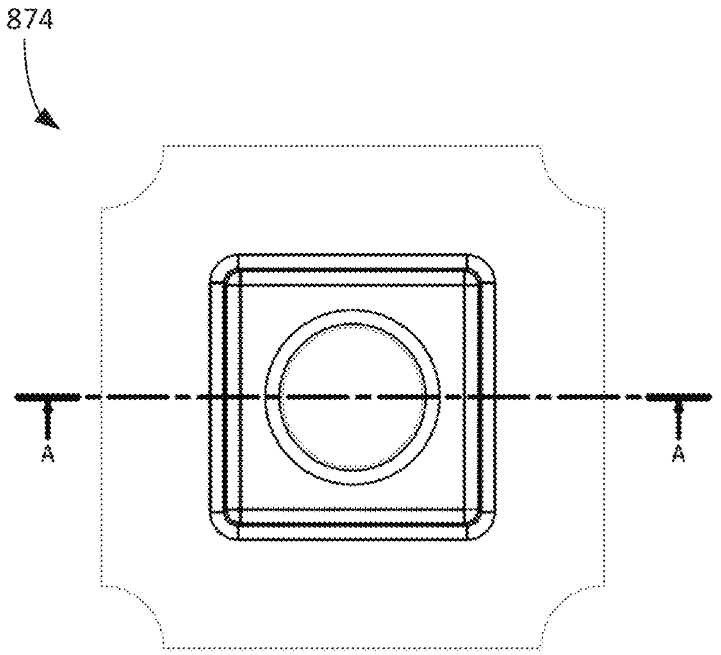
Figure 8B:
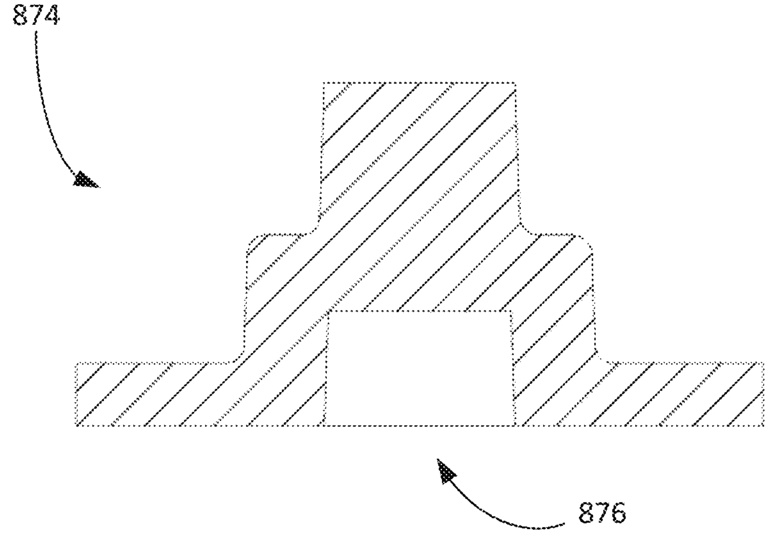

FIGS. 8*a* and 8*b* illustrate a standalone battery indicator light lens 874. The standalone battery indicator light lens 874 comprises an indicator light cavity 876 configured to receive a standalone battery indicator light 768 and to provide explosion protection of the type described herein for the standalone battery indicator light 768 when fixed to the pcb board 722.

In some embodiments, the LED protective lens arrays 324 are not present. In such embodiments, the luminaire enclosure 202 may still be explosion-encapsulating and encapsulate any explosion occurring within the luminaire enclosure 202.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Modifications may be made to adapt a particular situation or material to the teachings of the disclosure without departing from the scope thereof. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

The invention claimed is:

1. A flame protected luminaire enclosure comprising:

a luminaire enclosure cover including a luminaire lens with a first lens surface;

an LED protective lens array including a protective lens;

a luminaire enclosure backing with a first backing surface and a second backing surface spaced apart from the first backing surface, wherein the first lens surface is configured to be coupled to the first backing surface;

a pcb board including at least one LED element coupled to the second backing surface; and a luminaire cavity defined by a space extending between the first lens surface and the second backing surface;

wherein an explosion encapsulating flame path is formed in a seam between the first lens surface and the first backing surface; and wherein the LED protective lens array is configured to be secured to the luminaire enclosure backing over the pcb board by an adhesive such that the LED protective lens forms a mechanical seal against the pcb board that disallows a flame from travelling into or out of the protective lens of the LED protective lens array.

2. The flame protected luminaire enclosure of claim 1, further comprising a gasket disposed between the luminaire enclosure cover and the luminaire enclosure backing, wherein the gasket is disposed radially outside of an outer perimeter of the luminaire lens.

3. The flame protected luminaire enclosure of claim 1, further including a hollow compartment disposed on a backside of the luminaire enclosure backing, and wherein the hollow compartment further includes mounting equipment configured to mount the luminaire enclosure backing to a surface.

4. The flame protected luminaire enclosure of claim 1, wherein:

the luminaire lens includes the first lens surface and a second lens surface opposite to the first lens surface;

the second lens surface is sealingly connected to the enclosure cover; and wherein the first lens surface is flush with the first backing surface such that the depth of the first backing surface and the second backing surface is substantially equal to the height of the luminaire cavity.

5. The flame protected luminaire enclosure of claim 1, wherein the adhesive is cement.

6. The flame protected luminaire enclosure of claim 1, wherein the LED protective lens array includes a plurality of protective lens, and wherein the mechanical seal is configured to seal around a perimeter of each lens of the plurality of protective lenses.

7. The flame protected luminaire enclosure of claim 1, wherein the luminaire enclosure cover includes a fastener accommodating aperture, and wherein the luminaire enclosure backing is configured to be joined to the luminaire enclosure cover by an enclosure fastener.

8. The flame protected luminaire enclosure of claim 1, wherein each protective lens includes a plurality of inner walls forming tiered, concentric, conical cavities of differing slopes, diameters, and heights.

9. An LED array comprising:

an LED protective lens array including, a body having a first surface; and an LED protective lens extending from the body and including an LED accommodating cavity;

an LED element fixed to a second surface, wherein the first surface of the body is configured to be attached to the second surface by way of an adhesive material applied to the first surface and/or the second surface;

wherein the LED accommodating cavity is configured to overlay the LED element; and wherein attaching the LED protective lens array to the second surface via the adhesive forms a seal between the LED protective lens array and the second surface that disallows a flame from travelling into or out of the LED accommodating cavity when the LED protective lens array is attached to the second surface.

10. The LED protective lens array of claim 9, wherein the LED accommodating cavity includes a plurality of inner walls forming tiered, concentric, conical cavities of differing slopes, diameters, and heights.

11. The LED array of claim 9, wherein the adhesive is a cement.

12. The LED array of claim 9, wherein the LED protective lens array includes an aperture configured to receive a mechanical fastener for connecting the body to the second surface.

13. The LED array of claim 9, wherein the LED protective lens is a first LED protective lens and the LED element is a first LED element, the LED array further comprising, a second LED element, a third LED element, and a fourth LED element each fixed to the second surface;

a second LED lens extending from the body and including a second LED accommodating cavity configured to overlay the second LED element;

a third LED lens extending from the body and including a third LED accommodating cavity configured to overlay the third LED element;

a fourth LED lens extending from the body and including a fourth LED accommodating cavity configured to overlay the fourth LED element; and wherein the plurality of LED protective lenses includes four LED protective lenses arranged in a 2×2 configuration.

14. A flame protected luminaire enclosure comprising:

an LED protective lens array including a protective lens with an LED accommodating cavity;

a luminaire enclosure backing with a first backing surface and a second backing surface spaced apart from the first backing surface; and a pcb board including at least one LED element coupled to the second backing surface;

wherein the LED accommodating cavity is configured to overlay the LED element; and wherein attaching the LED protective lens array to the second surface via an adhesive forms a seal between the LED protective lens array and the pcb board that disallows a flame from travelling into or out of the LED accommodating cavity when the LED protective lens array is attached to the pcb board.

15. The flame protected luminaire enclosure of claim 14, wherein the adhesive is cement.

16. The flame protected luminaire enclosure of claim 14, further including a hollow compartment disposed on a backside of the luminaire enclosure backing, and wherein the hollow compartment further includes mounting equipment configured to mount the luminaire enclosure backing to a surface.

17. The flame protected luminaire enclosure of claim 14, wherein the LED accommodating cavity includes a plurality of inner walls forming tiered, concentric, conical cavities of differing slopes, diameters, and heights.

18. The flame protected luminaire enclosure of claim 14, wherein the LED protective lens array includes an aperture configured to receive a mechanical fastener for connecting the body to the second surface.

19. The flame protected luminaire enclosure of claim 14, further comprising a luminaire enclosure cover including a luminaire lens with a first lens surface, wherein the first lens surface is configured to be coupled to the first backing surface, and a luminaire cavity defined by a space extending between the first lens surface and the second backing surface.

20. The luminaire system of claim 14, further comprising, a clamp plate, overlaying the LED protective lens array;

wherein the LED protective lens array is secured to the pcb board by mechanical fasteners; and wherein the clamp plate is secured to the protective lens array by the mechanical fasteners.

* * * * *